US005705741A

United States Patent [19]

Eaton et al.

[11] Patent Number: 5,705,741

[45] Date of Patent: Jan. 6, 1998

[54] CONSTANT-FORCE PROFILOMETER WITH STYLUS-STABILIZING SENSOR ASSEMBLY, DUAL-VIEW OPTICS, AND TEMPERATURE DRIFT COMPENSATION

[75] Inventors: Steven G. Eaton, Sunnyvale; Rusmin Kudinar, Union City; William R. Wheeler, Saratoga, all of Calif.

[73] Assignee: Tencor Instruments, Santa Clara, Calif.

[21] Appl. No.: 362,818

[22] Filed: Dec. 22, 1994

[51] Int. Cl.[6] .......... G01B 5/28

[52] U.S. Cl. .......... 73/105; 33/551; 33/558; 33/558.4

[58] Field of Search .......... 73/104, 105; 33/521, 33/533, 546, 547, 551, 553, 554, 558, 558.4, 561

[56] References Cited

U.S. PATENT DOCUMENTS

| | | | |
|---|---|---|---|
| 2,691,887 | 10/1954 | Rinker | 73/105 |
| 3,283,568 | 11/1966 | Rason | 73/105 |
| 4,103,542 | 8/1978 | Wheeler et al. | 73/105 |
| 4,391,044 | 7/1983 | Wheeler | 33/561 |
| 4,441,177 | 4/1984 | Groh et al. | 369/170 |
| 4,574,625 | 3/1986 | Olasz et al. | 73/105 |
| 4,641,773 | 2/1987 | Morino et al. | 228/1.1 |
| 4,669,300 | 6/1987 | Hall et al. | 73/105 |
| 5,146,690 | 9/1992 | Breitmeier | 73/105 |
| 5,253,106 | 10/1993 | Hazard | 359/368 |
| 5,309,755 | 5/1994 | Wheeler | 73/105 |

FOREIGN PATENT DOCUMENTS

| | | | |
|---|---|---|---|
| 249910 | 10/1990 | Japan | 73/105 |
| 2009409 | 6/1979 | United Kingdom | 73/105 |

*Primary Examiner*—Hezron E. Williams
*Assistant Examiner*—Daniel S. Larkin
*Attorney, Agent, or Firm*—Majestic, Parsons, Siebert & Hsue

[57] ABSTRACT

A profilometer has a constant force mechanism for biasing of the stylus arm. The mechanism has a centrally-aligned configuration of the moving magnet relative to the magnetic coil and also has a magnetic shield isolating these elements from other ferromagnetic materials in the assembly. The moving magnet is made of a material that is hard magnetically and the magnetic shield is made of a series of low hysteresis, high permeability materials. The force thus generated by the stylus biasing device is very linear with the drive current upon the magnetic coil at any particular position of the stylus, thereby allowing for control and predictability of the stylus force upon the surface to be profiled. This predictability is used for dynamic stylus force adjustments during profiling of a specimen. The profilometer is also equipped with a balanced, spring-loaded stylus-stabilizing sensor assembly, task-specific dual-view optics for protection of the delicate stylus assembly, and a temperature drift compensator.

58 Claims, 6 Drawing Sheets

CONSTANT-FORCE PROFILOMETER WITH STYLUS-STABILIZING SENSOR ASSEMBLY, DUAL-VIEW OPTICS, AND TEMPERATURE DRIFT COMPENSATION

TECHNICAL FIELD

The invention relates to instruments for measuring profiles of surface features of a patterned semiconductor wafer or measuring fine texture on soft substrates.

BACKGROUND ART

Profiling instruments were first developed in the 1930's for the purpose of characterizing surfaces in terms of roughness, waviness and form. In recent years, they have been refined for precise metrology in the measurement and production control of the thin film artifacts which are the building blocks of semiconductor devices. As the semiconductor industry has progressed to smaller dimensions with each new generation of product, the need for more sensitive and precise profiling instruments has grown.

Profilometers and profilers currently in use in the semiconductor industry generally have a stylus with a hard tip suspended on a movable arm that contacts the surface of the specimen. Relative motion between the stylus and the specimen is effected by a translation mechanism. The stylus arm usually has an attached motion transducer indicative of the extent of stylus motion. There is also a lever or other member associated with the stylus arm which operates to bias the stylus force or control the force on the surface. See e.g., U.S. Pat. No. 5,309,755 to Wheeler, which actuates a lever via a magnetic field in its stylus force biasing means.

Standard profilometers have a source of error, however, in that the contact force that the stylus exerts upon the surface is variable. As the stylus moves vertically, e.g. over a ridge in the specimen surface, the spring constant of the flexural pivot suspending the stylus arm causes the stylus force to change. In instruments having magnetic coils acting on moving magnetic cores to set the stylus force, the force exerted by the force coil also changes with the vertical position of the stylus, largely due to variations in the magnetic field gradient which results in large, rapid changes in force with position of the magnetic core. This variability combined with force hysteresis in the magnetic circuit prevents dynamic control of the stylus, and can cause distortion in the surface readings. Precise control of the instrument requires making the stylus force more uniform.

In U.S. Pat. No. 4,669,300 granted to Hall et al., an electromagnetic stylus force adjustment mechanism is disclosed. The device has a core of magnetic material which is within an electromagnetic coil and is connected to the stylus, and a linear variable differential transformer ("LVDT") which monitors motion of the stylus. The magnetic element and the LVDT are either counter-balanced about a pivot point or axially-aligned and spring-balanced. The device is intended to improve upon profilers not having magnetic coils and to thus provide a stylus force which is easily adjustable from the instrument control panel.

An object of this invention is to provide a mechanism for making the stylus force in a profilometer constant despite scanning along the surface of a specimen and variations in the vertical position of the stylus. This mechanism should be robust enough to maintain constant force when a flexure pivot is used for the stylus arm pivot. This mechanism should also add minimal moment of inertia to the stylus arm to minimize dynamic forces on the specimen as the stylus is accelerated up and down while scanning across the specimen.

Profiling instruments may further be improved through the increased safety and reliability provided by rapid stabilization of the delicate profiling arm. Because the stylus tip and the stylus arm suspension are delicate, any lateral contact on or just above the stylus tip may cause serious damage to the instrument. The usual means for protection is a lift/lower mechanism which raises the stylus arm or the entire stylus assembly above a protection plane after the completion of a scan. The lifting and lowering motion causes a problem with stability, however, due to the fact that if the stylus arm does not come to a state of absolute rest within a few seconds after being lowered, the settling motion may appear as an aberration in the scan trace. Also important is precise X-Y location of the stylus tip on the specimen and resistance to vibration and shock.

In addition, it is important that the stylus tip be visible for examination during profiling and during specimen changes. Standard profilometers contain an integrated microscope for viewing of the specimen. The microscope may provide a side or front view of the specimen, which has the advantage of allowing observation of the stylus tip and specimen during profiling, but causes geometric distortions because of the severe viewing angle. Distortions are troublesome for image processing and pattern recognition applications. Other profilometers contain a top-down view of the specimen. That angle provides a fully-focused field of view, but obscures the stylus-to-specimen pairing during the scan operation.

It is thus a further object of this invention to provide a profilometer having stylus assembly stabilization and improved viewing optics for the protection of the fragile stylus tip.

Another difficulty encountered during highly sensitive profile measurement is the undesired effect on profile data due to temperature changes. It is therefore another object of this invention to provide a means for removing temperature change deviations from the profile measurement data.

DISCLOSURE OF THE INVENTION

The above objects have been achieved with a profilometer for microstructures that maintains a constant force upon the stylus and also contains a stylus stabilizing sensor assembly, dual-view optics, and a temperature drift compensator. In the present invention, force on the stylus is measured in terms of displacement of the stylus arm. The stylus force is compared with a desired level of force and an error signal, i.e. feedback, dynamically controls the stylus force by adjusting stylus bias using a magnetic coil and a moving magnet. The constant force is finely adjusted through the use of low hysteresis materials within the magnetic circuit, specific positioning of the moving magnet and magnetic coil mechanism of the stylus biasing means, and through magnetic shielding of the stylus biasing means with low hysteresis, high permeability materials. The force thus generated by the stylus biasing means is very linear and repeatable with the drive current upon the magnetic coil at any particular position of the stylus. This greatly improves the steadiness and, therefore, the predictability of the force upon the stylus. This characteristic is then used to dynamically change the force coil current as the stylus moves vertically, which cancels the flexure pivot spring rate and force coil variations.

The moving magnet is positioned symmetrically along the axis of the magnetic coil, balanced within the ambient magnetic environment of the assembly, and is made of a material that is very hard magnetically, i.e. its magnetization is not affected by externally applied magnetic fields. The moving magnet is preferably positioned apart from the coil, but very close to it. Other ferromagnetic materials are preferably positioned well away from the moving magnet and magnetic coil mechanism of the stylus biasing means, and the ferromagnetic parts of the profilometer assembly are preferably run below their saturation levels.

Additionally, uniformity is preserved by placing the magnetic coil first in a closely spaced primary magnetic shield, such as a powdered iron cup, that houses the coil as well as the moving magnet. Then the primary magnetic shield and its contents are substantially enclosed in a secondary magnetic shield, such as a cylinder made of a nickel-iron alloy. The magnetic shielding isolates the stylus force biasing means from the ferromagnetic materials in the profilometer that cause interference in the magnetic circuit.

The profilometer of the present invention is further improved through a stabilizing and safety feature designed to protect the stylus arm from hazards during specimen changes. The sensor assembly of the present invention is a balanced, spring-loaded support for the stylus arm that ensures a quick, repeatable resetting of the stylus for each specimen and is resistant to vibration.

In addition, the invention contains a dual-view, task-specific optical feature that overcomes the difficulties of choosing either top-down or side/front viewing angles. The two views of the microscope are associated with the engagement of the stylus tip and the specimen via mechanical cranks. While the stylus is lifted above the specimen, the optics provide a top-down view allowing proper alignment and pattern recognition of the specimen. As the stylus is lowered onto the specimen, a mirror is shifted out of the optical path and the optics provide a view from a side or front angle that allows observation of the stylus tip during profiling.

Another improvement to the profilometer of the present invention is a temperature drift compensator means which is used to remove the effects of temperature changes, i.e. mostly a vertical offset and a change in the vertical scale of the profile data. The temperature drift compensator includes a temperature measurement device that produces a voltage as a function of the air temperature near the sensor assembly. The voltage is converted to a digital form and a digital signal processor calculates the temperature using this data. The predicted temperature drift of the profile data is computed as a function of temperature and this predicted drift is utilized for data correction.

The above invention has the advantage of affording greater sensitivity and precise dynamic control during the process of profiling surfaces. Further advantages include task-specific viewing optics, improved safety and stability, and compensation for temperature drift during profiling.

BEST MODE FOR CARRYING OUT THE INVENTION

Figure 1:
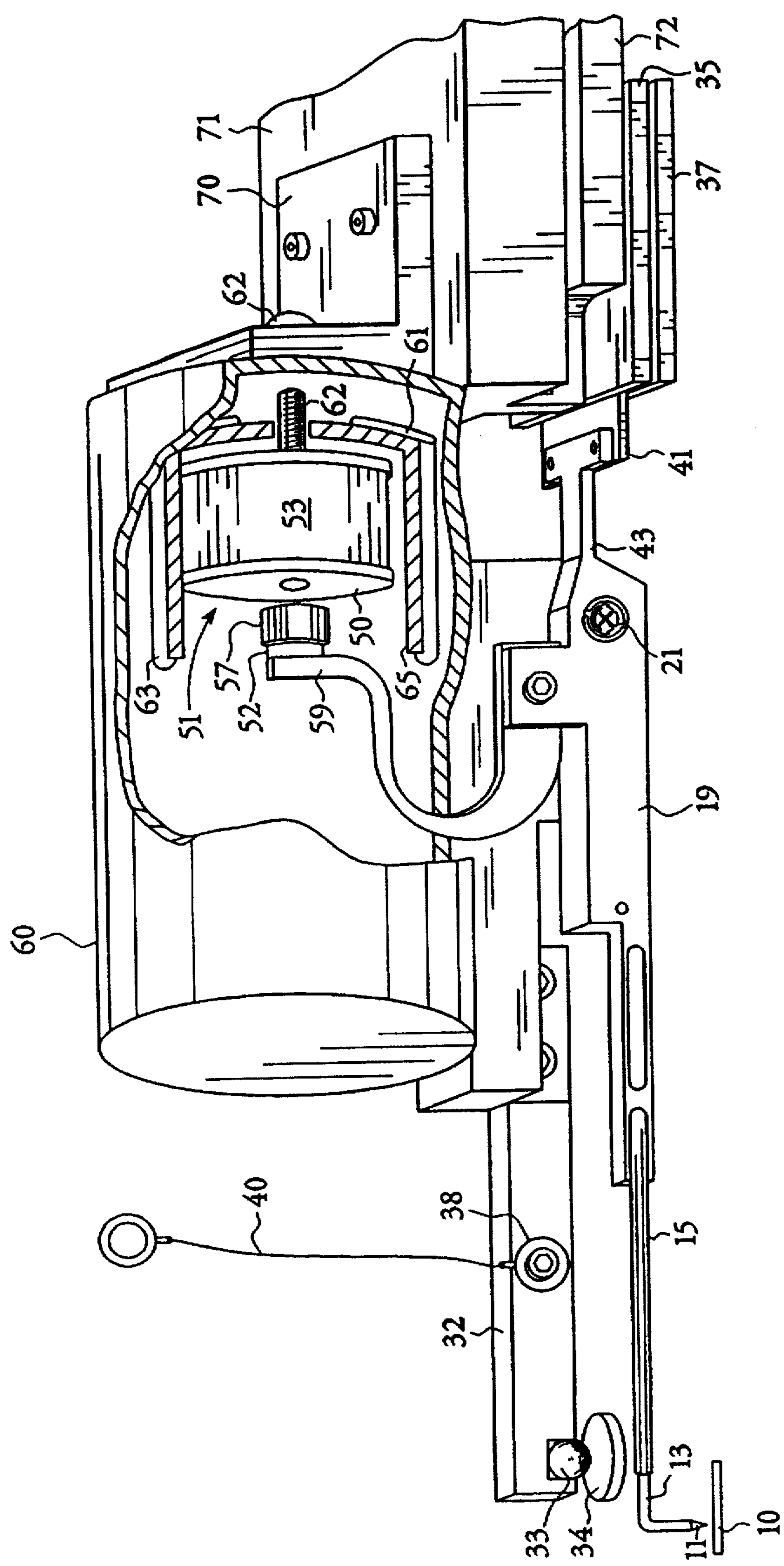
FIG. 1 is a side perspective view of a profilometer stylus assembly of the present invention.

With reference to FIG. 1, a diamond tip 11 having a radius of 0.01 mm. is adhered to an end of a slender stainless steel wire 13 which is bent at a right angle. The wire radius is about 0.25 mm. The diamond tip is adhesively mounted to a squared-off end of the wire 13 while the opposite end of the wire 13 is inserted into an elongated hollow aluminum arm 15 which has a length of approximately 2 cm and a wall inside radius of approximately 0.018 cm. The aluminum arm is sufficiently rigid that it will not bend when sensing step heights, yet sufficiently low mass that its moment of inertia can be kept low. The overall mass of the arm, wire and diamond tip should preferably not exceed approximately 0.05 grams. Arm 15 fits into a support block 19 and is operably connected to flexural pivot 21, which also fits into support block 19. In this manner, the aluminum arm 15 has a center of rotation about the flexural pivot 21. The flexural pivot 21 has enough torsion to lightly hold the stylus tip 11 downwardly against a surface to be measured, such as specimen 10. The entire mass on the stylus side of the pivot should preferably not exceed 0.50 grams, including a lever 59 described below.

An electrical solenoidal coil 51 is comprised of wire coil 53 around a plastic bobbin 50. The wire used is preferably thousands of turns of fine copper wire. The coil 51 becomes magnetized on application of current by means of wires 55, seen in FIG. 2. The magnetized coil 51 attracts a ferromagnetic tip of an aluminum lever 59. The lever 59 has an end opposite the ferromagnetic tip which is affixed to the support block 19. The ferromagnetic tip is preferably a magnet that is made of a material that is very hard magnetically and has a very strong field for its size, such as a neodymium-iron-boron magnet. A magnet 57 is shown in a holder 52 attached to the end of lever 59 opposite support block 19 in FIGS. 1–3. Lever 59 is preferably curved so that magnet 57 may be positioned directly above flexural pivot 21. By applying current to the wires 55 and magnetizing the coil 51, magnetic force is exerted on the lever 59 causing a force bias in the form of a pull toward or away from the center of coil 51. The lever 59 should be lightweight, yet stiff so that the lever will not bend on the application of magnetic force. The magnet 57 and magnetic coil 51 are part of the stylus force biasing means of the present invention.

Variations in the force exerted as the magnet 57 moves may be minimized and the magnitude of the force maximized by placing the magnet 57 near the position of the peak magnetic field gradient, i.e. on the axis of the coil 51 and proximate to the plane of the end of the coil winding. In the preferred embodiment of the invention, the magnet 57 is spaced apart from the coil winding 51 to prevent it from traveling inside the center bore of the coil. At its closest position, magnet 57 is nearly touching the coil 51. The placement of magnet 57 allows for easy adjustment of the position of the magnet. Alternatively, magnet 57 can be positioned so that it enters the center bore of the coil 51; such alternative position 57' of the magnet and the corresponding short screw 62' are shown in dotted lines in FIG. 2. This allows the magnet's range of travel to be centered on the peak of the magnetic field gradient, but requires precise alignment of the magnet 57 with the coil 51.

The use of a very powerful material for the magnet 57, such as a neodymium-iron-boron material, allows the magnet to be very small and light in weight and to still generate useful amounts of force. In the preferred embodiment, the magnet is 3 mm in diameter and 1.5 mm thick. The corresponding low current requirement minimizes the power dissipated in the coil, which minimizes the heat generated. This, in turn, minimizes the thermally-induced expansion and contraction of the materials comprising the profilometer assembly. These thermally-induced size changes can cause undesirable drift in the measured profile of the specimen.

Figure 2:
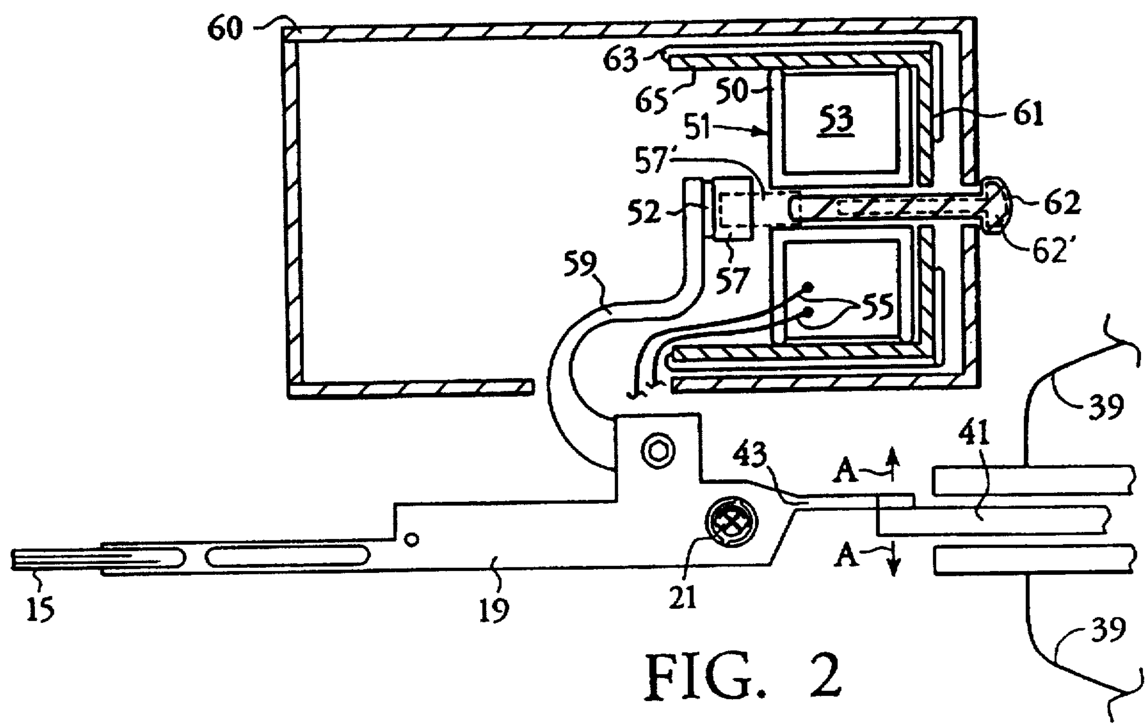
FIG. 2 is a side plan view of the profilometer stylus assembly of the present invention.
Figure 3:
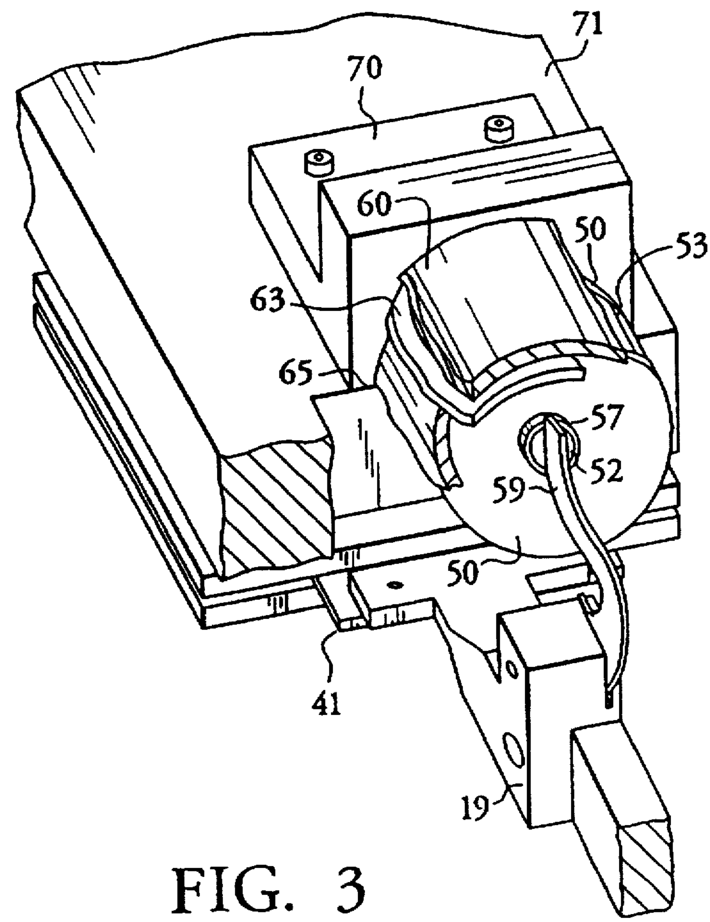
FIG. 3 is an end perspective view showing details of the stylus force biasing means of the present invention.

Coil 51 is closely housed in a primary magnetic shield 65, seen in FIGS. 1–2, which is made of a ferromagnetic material and shaped like a cup. The primary shield 65 is preferably made of a ferrite material that has very low hysteresis and high permeability. Also acceptable is Carbonyl CQ4 powdered iron with a permeability of 35, which was used in the prototype instrument. The primary shield acts as a return path for the magnetic flux generated by the coil 51. By keeping the flux close to the coil, primary shield 65 keeps the flux from flowing through more distant ferromagnetic materials, such as the motors and iron parts in the sample stage of the profilometer. The primary shield 65 is preferably run below its magnetic saturation level, which contributes to good linearity. Primary shield 65 has a small hole at its closed end center for a brass, or other nonmagnetic, mounting screw 62, which attaches the primary shield 65 and the coil 51 to an L-shaped bracket 70 of the support of the instrument. The open end of primary shield 65 allows for insertion of the coil 51 and that portion of lever 59 having magnet 57.

Surrounding primary shield 65 is a secondary shield 60 which is also made of a low hysteresis, high permeability material. Preferably, secondary shield 60 is fabricated from a very high permeability nickel-iron alloy, such as Amumetal which has a magnetic permeability of 30,000. The preferred embodiment of secondary shield 60 is a cylindrical can made of 0.004" thick foil which is symmetrically positioned about primary shield 65 and its contents. The secondary shield 60 acts as a return path for any flux from coil 51 which escapes from the primary shield 65. The secondary shield also prevents any externally generated magnetic fields from reaching the magnet 57 and exerting stray forces on it. The motors used to move the specimen stage could generate significant fields at the magnet 57 without this shielding. There are two small openings in secondary shield 60. The first hole is for mounting screw 62 and the axial alignment of the primary and secondary shields. This places the secondary shield 60 symmetrically about the primary shield 65. The second slot, visible in FIG. 2, is for penetration and movement of lever 59 and for wires 55 of the coil 51. Secondary shield 60 is spaced apart from primary shield 65 by heat shrink tubing 63 and plastic washer 61. These serve as nonmagnetic spacers and maintain a gap between the shields of at least 0.01". If needed, more shielding may be utilized. This may be done either through increased foil thickness, e.g. 0.006" to 0.010", or an additional layer, as in another cylindrical shield 65 surrounding the secondary shield 60.

A centering of magnet 57 within magnetic shields 60 and 65 also reduces force variations with position. The magnet 57 is attracted to the ferromagnetic material making up the shields 60 and 65, but, as the magnet 57 moves, it travels toward and away from equal amounts of ferromagnetic material at equal distances, thus canceling the change in force on the magnet.

In the preferred embodiment, the underside of a support body 71 has attached a transducer support 72 which acts as an elevational adjustment for a pair of spaced-apart parallel capacitor plates 35 and 37. The spacing between the plates is approximately 0.7 mm, with an air gap between the plates. A small spacer, not shown, separates plate 35 from plate 37 and a screw fastens the two plates to transducer support 72. The area extent of the plates should be large enough to shield the vane 41 from outside air, so that the vane experiences resistance to motion due to compression of air momentarily trapped between the closely spaced plates. A pair of electrical leads 39 of FIG. 2 is connected to the parallel plates, one lead to each plate. Between the parallel plates, a low mass electrically conductive vane 41 is spaced, forming a capacitor with respect to each of the parallel plates 35 and 37. The range of motion of the vane, indicated by arrows A in FIG. 2, is plus or minus 0.16 mm. Moreover, vane 41, being connected to the support block 19 and flexural pivot 21, damps pivoting motion as the vane attempts to compress air between the parallel plates. This damping motion of the vane serves to reduce vibration and shock which may be transmitted into arm 15. Vane 41 is connected to a paddle 43 which is the rearward extension of support block 19, opposite stylus arm 15, serving to counterbalance the arm. The total mass of the vane, paddle and pivot member on the vane side of the pivot should preferably not exceed about 0.6 g. Movement of the vane between plates 35 and 37 results in change of capacitance indicative of stylus tip motion. Such a motion transducer is taught in U.S. Pat. No. 5,309,755 to Wheeler.

The illustrated configuration of the support body 71, L-shaped bracket 70, and transducer support 72 is intended only as an example of a support for the profilometer stylus assembly of the present invention. Additionally, the stylus displacement measurement means or motion transducer described and positioned relative to the stylus tip is preferred, but may be substituted by an equivalent means for indicating the stylus tip motion.

In operation, the stylus tip 11 scans a surface to be measured, such as a patterned semiconductor wafer. Scanning may be achieved either by moving the stylus arm frame with respect to a fixed wafer position or alternatively moving the wafer, on an X-Y wafer stage with the position of the stylus fixed, or a combination of the two motions. In the latter instance, the stylus arm may be moved linearly in the X direction while the wafer is advanced in the Y direction after each lengthwise X direction scan. The stylus tip 11 is maintained in contact with the surface of the wafer at a steady level of force by an appropriate bias applied through the coil 51 into the lever 59. The bias should be great enough to maintain contact, but not damage the surface being measured. Deflections of the tip 11 are caused by topological variances in the surface being measured and these are translated rearwardly through the flexural pivot 21 to the vane 41. Vane 41 resists undesirable large amplitude motion due to vibration because of the air displacement between the parallel plates 35 and 37. However, as the air is compressed and displaced, the vane 41 moves slightly causing a signal in electrical leads 39 reflecting a change in an electrical bridge circuit connected to these wires. At the end of a scan, the tip 11 is raised to protect it from damage in the event that a wafer is changed.

In building arm 15, wire 13 and tip 11, it is desirable to maintain the moment of inertia as small as possible. The mass-radius squared product should preferably not exceed about 0.5 g-cm$^2$. The current design has a mass-radius squared product of 0.42 g-cm$^2$. The radius is measured with respect to the center of the flexural pivot 21 to the furthest radial extent of the steel wire 13. A similar moment of inertia is calculated with respect to the vane 41 and the lever 59. The sum of the moments is termed the moment of inertia for the entire stylus arm. By maintaining a low moment of inertia, the stylus arm is less sensitive to vibration. Greater resolution in profile measurements of thin films, and the like, may therefore be achieved in the preferred embodiment.

The present invention signifies an improvement over the prior art because it allows for a dynamic change in the force coil current as the stylus moves vertically, thereby eliminating the stylus force variability of previous devices. The instrument of the present invention may be calibrated by servoing the drive current to move the nonengaged stylus to regularly spaced positions to create a table of position versus current settings. That table provides the data for a polynomial curve fit approximation. A digital signal processor uses the curve fit to dynamically change the force setting as the position measurements are taken, with a specimen in place. A positive, constant force is generated by adding a steady current offset to the fit polynomial, as a direct fit would result in zero force.

Figure 4:
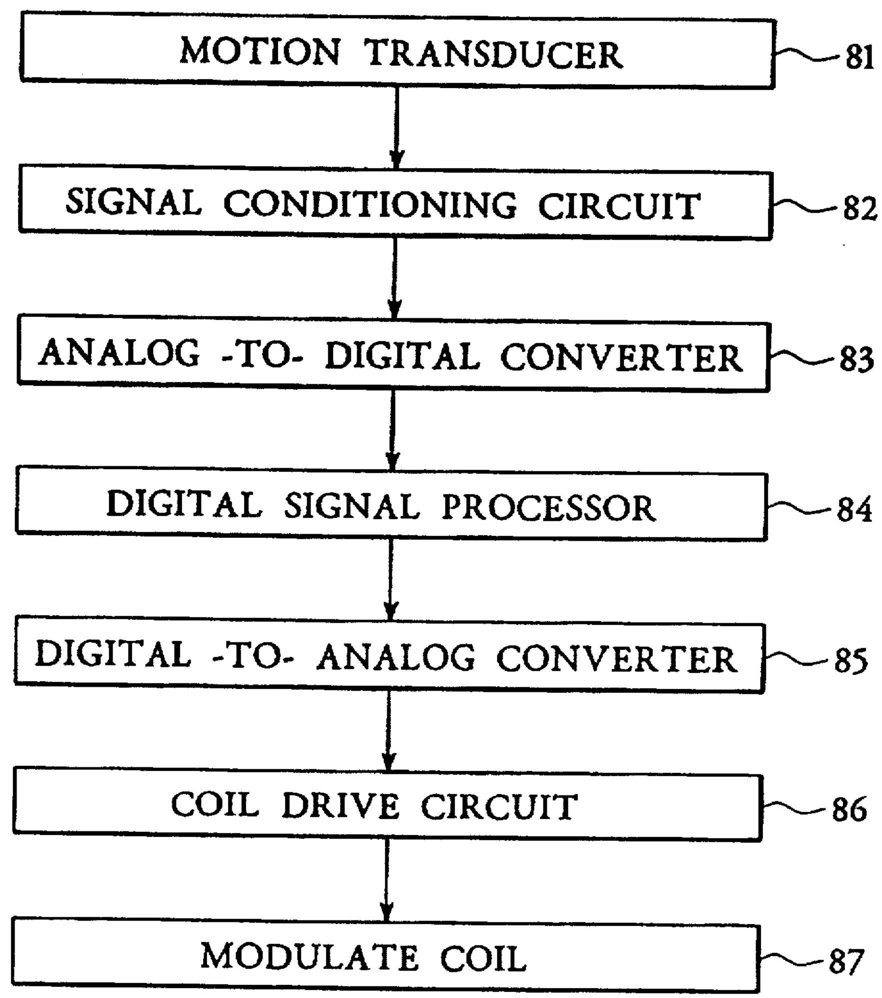
FIG. 4 is a block diagram of the electronics for stylus force adjustment according to the present invention.

FIG. 4 provides an illustrative block diagram of the above stylus force adjustment electronics. The electrical signals produced by motion transducer 81, i.e. vane 41 in conjunction with parallel plates 35 and 37, are selected and stored within a signal conditioning circuit 82 for specified vertical positions, creating data points, while the stylus tip 11 is not in engagement with specimen 10. Since the stylus tip is supported by a flexure, i.e. a torsion spring, the data points are directly proportional to force levels because of the spring law, F=kx. The signals are then converted to a digital format by converter 83 and a digital signal processor 84 generates a polynomial curve for the data points. The curve is then adjusted by processor 84 to represent the force desired upon stylus tip 11 during profiling. The adjusted curve provides modulation instructions, i.e. feedback signals, which are converted to an analog format by converter 85 and signal the circuit 86 driving the coil 51 to modulate current 87 within the coil for constant stylus force.

Figure 5:
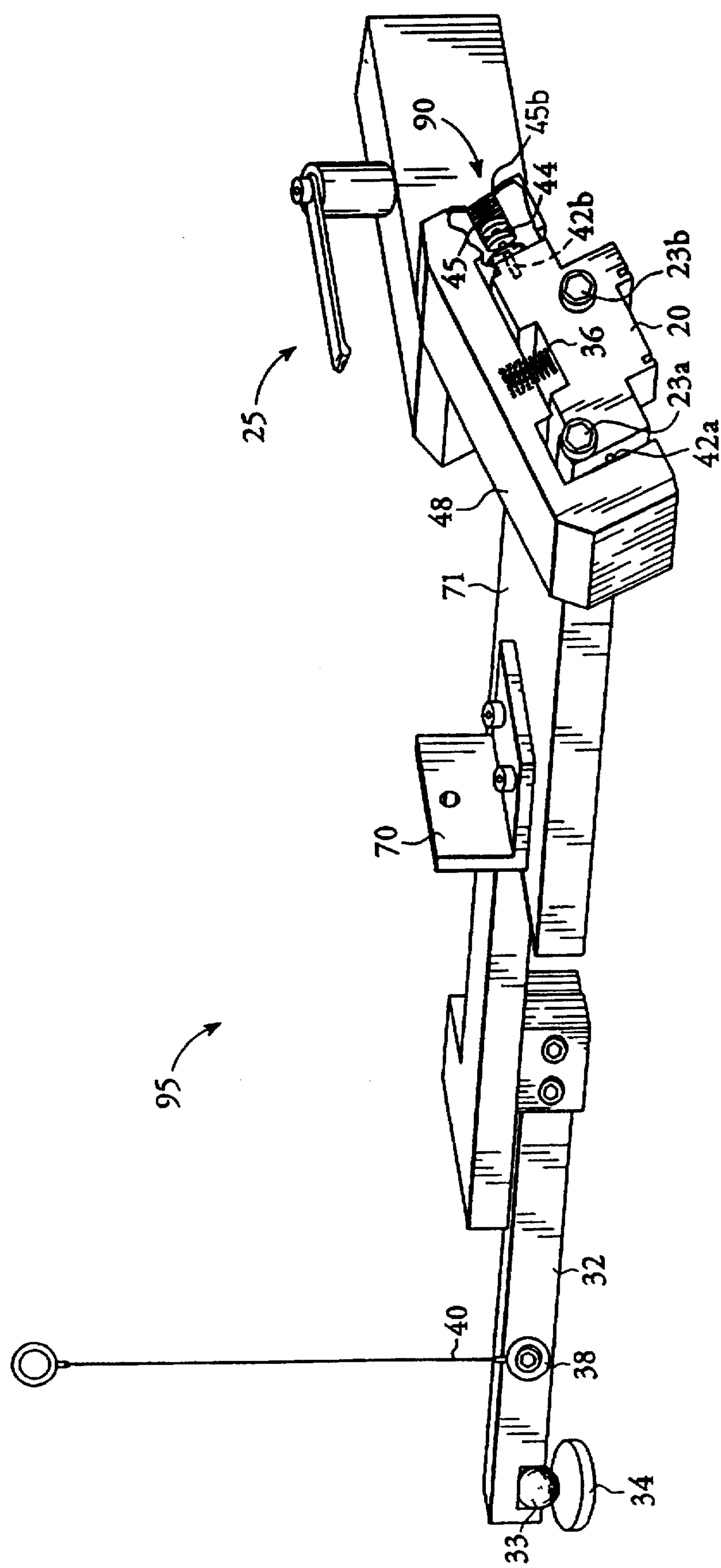
FIG. 5 is a perspective view of the sensor assembly and the temperature measurement device of the present invention.

Referring to FIG. 5, sensor assembly 95 is shown. The delicate stylus arm assembly, stylus displacement measurement means, and the magnetic shielding have been removed to show details of sensor assembly 95. FIG. 1 shows a portion of sensor assembly 95 together with these other parts of the profilometer, however. In FIG. 5, support body 71 is a large block having an end piece 20 with a pivot shaft 90 at a first end and a stabilizing arm 32 at a second end. Pivot shaft 90 acts as a coarse pivot, unlike the fine flexural pivot 21 that operates the stylus arm. There is a hard ball 33 attached to the underside of stabilizing arm 32. The ball 33 and the two ends of the pivot shaft 90 serve as the three points of a triangle the points of this triangle define small contact points which are finished surfaces of hard, high modulus materials. The mass center of the support body 71 is within this triangle, contributing to the proper balance of the support body 71 while it is in the profiling position. When support body 71 is lowered, ball 33 comes to rest on pad 34. Pad 34 is in a fixed position and attached to a support bracket of the profilometer which is not shown in FIG. 5.

Figure 6:
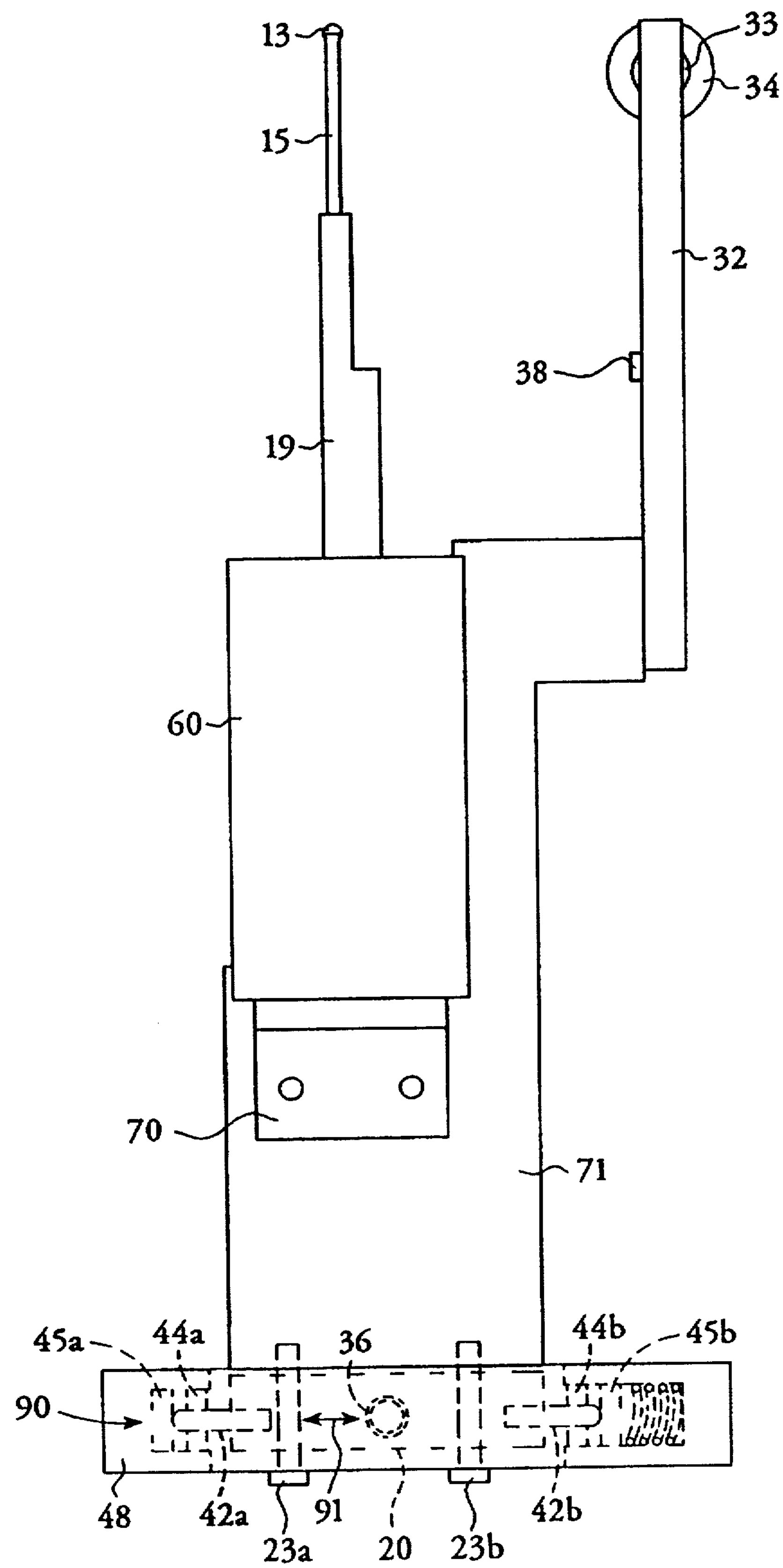
FIG. 6 is a top plan view of the profilometer of the present invention, showing details of the sensor assembly.
Figure 7:
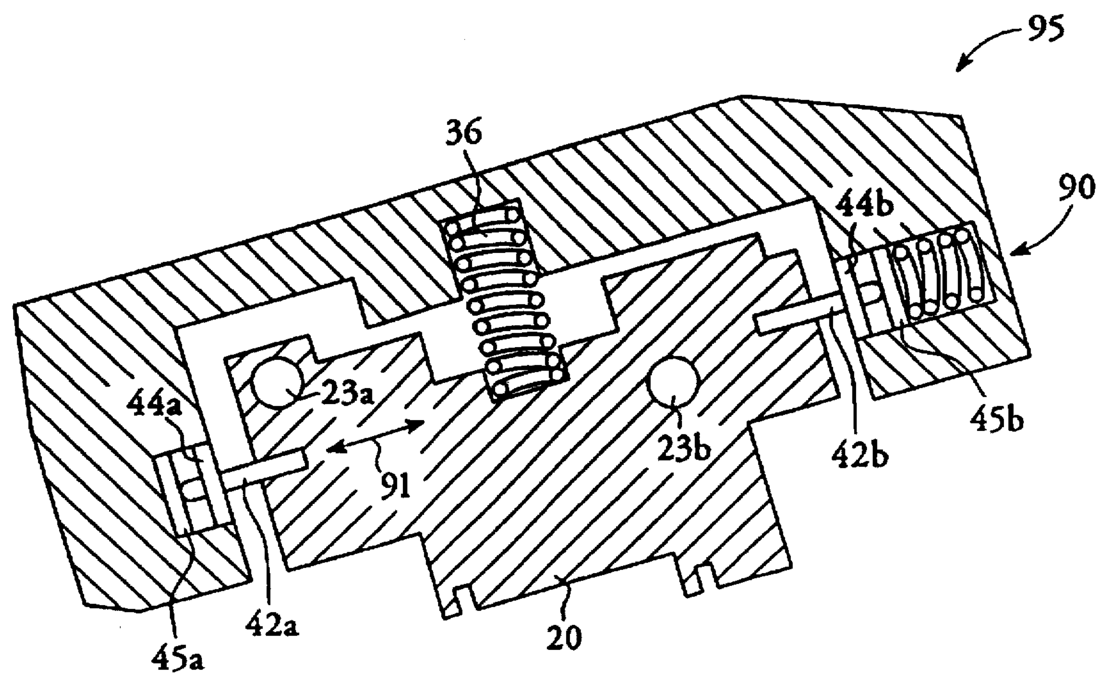
FIG. 7 is a cross-sectional end view of the end piece and support bridge of the sensor assembly of the present invention.

Pivot shaft 90 is more clearly illustrated in FIGS. 6–7. The pivot shaft 90 actually comprises two hardened metal pins **42*a–b* which are aligned along an axis 91. Each pin 42*a–b* is supported by an annular bearing 44*a–b*. Each annular bearing 44*a–b* has an inner toroidal surface which provides a point contact to the pin 42*a–b*, to lessen the possibility of misalignment. Fixed end bearing 45*a* axially locates pin 42*a*, while spring-loaded end bearing 45*b* applies axial force to pin 42*b* to maintain precise axial position of the sensor assembly. The polished spherical ends of pivot shaft 90 provide minimal bearing contact and very low friction torque. Preferably, pins 42*a–b* are made of polished hardened steel alloy and ball 33, bearings 44*a–b*, and pad 34** are made of sapphire.

Bridge 48 is shown in FIGS. 5–7. FIG. 7 presents bridge 48, end piece 20, and the elements of pivot shaft 90 in cross section. Bridge 48 serves to hold the ends of pivot shaft 90 and also holds one end of spring 36. The other end of spring 36 is held by end piece 20. End piece 20 is preferably shaped to allow pivot shaft 90 to be positioned at a 20° angle from horizontal. End piece 20 contains holes for placement of two mounting screws **23*a–b*, which are positioned horizontally relative to each other and serve to attach end piece 20 to support body 71. Spring 36 exerts a downward force to keep pivot shaft 90 in contact with the annular bearings 44*a–b* at the lowered, stable position of sensor assembly 95. If pivot shaft 90 does shift relative to the annular bearings 44*a–b*, then spring 36 operates in conjunction with gravity to return pivot shaft 90** to its stable position in minimal time after reaching the lowered, measurement position.

Sensor assembly 95 operates through a lifting of stabilizing arm 32. This can be accomplished through a string 40 attached at lift point 38, as illustrated in FIG. 5. The rotation of support body 71 about pivot shaft 90 results in a slanted arcuate path of motion for sensor assembly 95. This is because of the shape of end piece 20 and the subsequent positioning of pivot shaft 90. This slanted path is useful in clearing sensor assembly 95 from the path of attached viewing optics. Because support body 71 is attached to support block 19, as seen in FIG. 1, the lifting of sensor assembly 95 also lifts the stylus arm 15 up and away from specimen 10. When sensor assembly 95 is raised, the specimen may be easily exchanged without damage to the stylus or the sensor assembly. Sensor assembly 95 thus protects stylus arm 15 from damaging lateral forces. When stabilizing arm 32 is lowered, spring 36 and the ball 33-pad 34 combination assist in rapid stabilization of the delicate profiling assembly of the present invention. The elements of sensor assembly 95 contribute to an improved profilometer because they allow a short settling time, position stability and repeatability, and resistance to the vibration and shock to which such delicate instruments may be subjected. This is due to the balanced, spring loaded nature of sensor assembly 95 and to the small, finely finished contact areas and hard materials at its support points.

Figure 8:
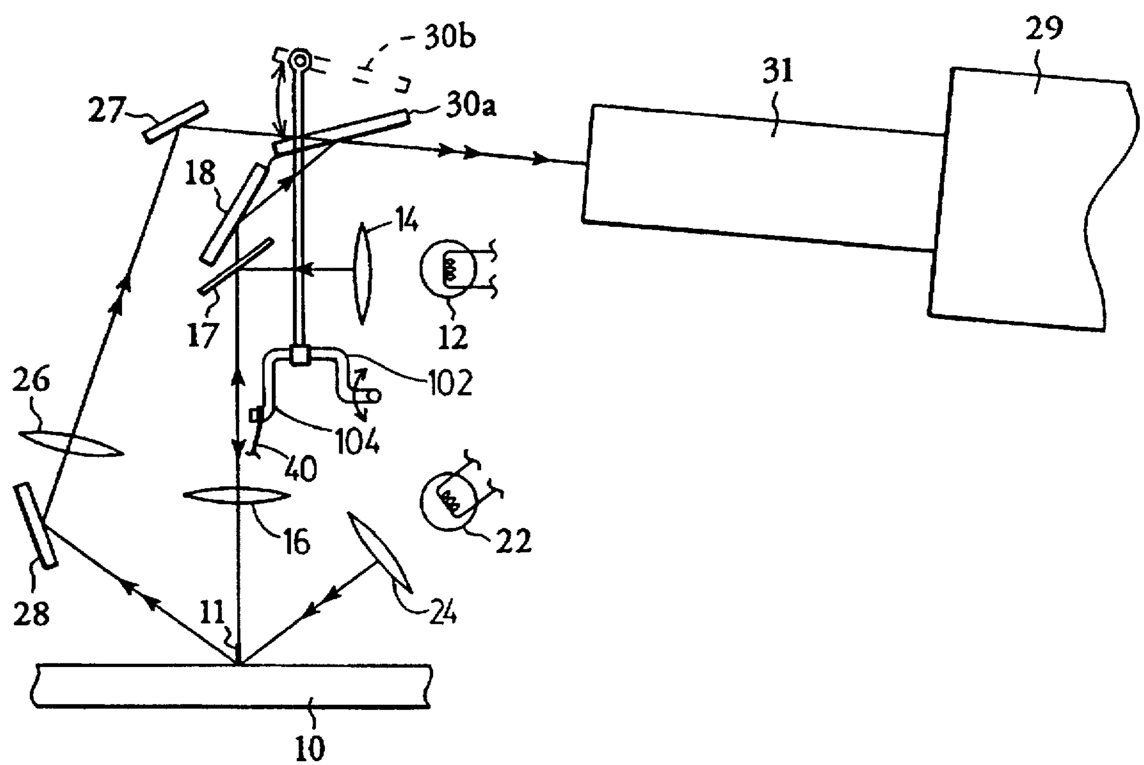
FIG. 8 is a plan view of the dual-view optics of the present invention.

With reference to FIG. 8, stylus tip 11 is shown in engagement with specimen 10. The target area for profiling of specimen 10 is visible from a top-down view according to the light path marked with the singular arrowheads. A top-view light source 12 is directed via top-view illuminator focusing lens 14 to dichroic beam-splitter 17 and then through top-view objective lens 16, which is positioned directly above specimen 10, to illuminate specimen 10. The image of specimen 10 at the target area is then directed back through top-view objective lens 16 and dichroic beam-splitter 17. From there, it is reflected from mirror 18 to mirror 30, which is in its first position, represented by **30*a*. Then the image is collected through zoom lens 31 of camera 29**.

The first position **30*a* of mirror 30 is directly in the path of the singular arrowhead top-view optics and corresponds to the disengagement of stylus tip 11 and specimen 10. When stylus tip 11 is engaged and in contact with specimen 10, mirror 30 is shifted to its second position, represented by 30***b*, for a side or front view of the target area of specimen 10.

In the side view, the light path taken is marked by double arrowheads. A side-view light source 22 illuminates specimen 10 through side-view illuminator focusing lens 24. Preferably, side-view light source 22 is positioned at an angle of approximately 45° to specimen 10. The image of specimen 10 at the target area is then directed to mirror 28, which is located at an angle to the target area, and through side-view objective lens 26. From there, the image is reflected off mirror 27 and through zoom lens 31 of camera 29. Thus, the double arrowhead side-view optics are unobstructed by mirror 30 when mirror 30 is in its second position 30*b*, as shown in FIG. 8.

The operation of mirror 30 is preferably connected to the motion of lifting and lowering stylus tip 11 from specimen 10. It is preferably connected to sensor assembly 95. Two cranks 102, 104 rotating on a common shaft (not shown) constitute the mechanism controlling these two motions. One crank 102 operates mirror 30 and the other 104 pulls up on the sensor assembly through a string. The shifting of mirror 30 to position 30*a* is matched by a lifting of the stylus tip 11 from specimen 10. This permits a top-down view of the placement and alignment of each new specimen, especially with regard to specific patterns within the specimen. When mirror 30 is shifted to position 30*b*, on the other hand, the stylus tip 11 engages with specimen 10 and a side view is afforded, allowing a clear viewing angle of stylus tip 11 against specimen 10 during profiling. The two separate light sources 12 and 22 are critical in providing illumination from the correct incidence angle for each of the views. The dual-view optics of the present invention represent a combination of the preferred aspects of the top-down and side/front views of previous profilometers.

Returning to FIG. 5, a temperature measurement device 25 is shown mounted to a support above sensor assembly 95 and serves to measure air temperature within the profilometer. Temperature measurement device 25 produces a voltage as a function of temperature. The measured voltage is converted to a digital format and then a digital signal processor calculates the temperature using this data.

A temperature drift compensator is advantageous because temperature changes during highly sensitive profiling may cause deviations in the profile data. These changes include a vertical offset in the height at a given position of the specimen and a change in the vertical scale or gain of the profile, such as an aberration in the measured height of a step in a specimen.

The temperature drift compensator operates by producing estimated temperature offsets and gains and these numbers are used to correct the vertical measurement data points. The prediction of temperature drift as a function of temperature is calculated by first exposing the profilometer to a sudden change in ambient temperature and then measuring the offset and gain of a given vertical measurement to arrive at the step response of the instrument. Well-known numerical algorithms are used to compute the impulse response of the offset and gain of a this data. Alternatively, a simple record of the temperature versus the offset and gain may be used to calculate the impulse response. The offset is taken by measuring the height of a single spot on a specimen without moving the specimen. The gain is taken by repeatedly measuring the height of a step on a specimen.

Figure 9:
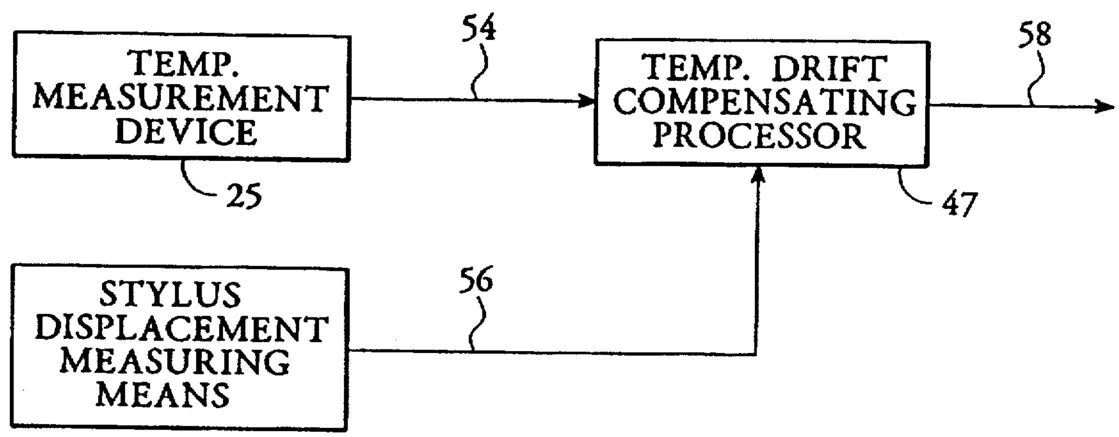
FIG. 9 is a block diagram of the operation of the temperature drift compensator.

During profiling, the digital signal processor controlling acquisition of vertical measurement data keeps a log of the measured temperature at various times. For each vertical measurement, the impulse response of the offset and gain as a function of temperature is convolved with the temperature log to produce the estimated temperature offset and gain. Correction of vertical measurement data points is then possible with this information. FIG. 9 illustrates the operation of the temperature drift compensator. Temperature measurement device 25 produces temperature measurement signals 54 which are input to the temperature drift compensating processor 47. Temperature drift processor 47 also receives vertical measurement signals 56 from the stylus displacement measurement means or motion transducer of the profilometer. Temperature drift processor 47, which stores temperature impulse response information, as described above, then performs the corrections for vertical offset and gain and the result is a temperature compensated data output 58. By making this correction, the effects of temperature changes are substantially removed from the profile measurement.

What is claimed is:

1. A profilometer for microstructures comprising, an elongated stylus arm having a stylus tip mounted thereon for contact with a specimen, said arm being substantially rigid when the tip is in contact with and moved over the specimen, stylus displacement measuring means rigidly connected to said arm to provide a current position signal to indicate a current position of the stylus tip when the tip moves over the specimen, a stylus force biasing means operably connected to the stylus arm for urging the stylus tip into contact with the specimen, and feedback means in response to the current position signal from the stylus displacement measuring means for controlling the stylus force biasing means to apply a desired level of force to the specimens, said force being a function of the current position of the stylus tip.

2. The profilometer of claim 1 wherein the stylus force biasing means comprises, a coil having a center bore and generating a magnetic field, a lever with a first end operably connected to the stylus arm and a second end having a ferromagnetic tip spaced apart from the coil but in communication with the magnetic field, whereby the magnetic field actuates the lever.

3. The profilometer of claim 2 wherein the ferromagnetic tip is composed of a hard magnetic material.

4. The profilometer of claim 2 wherein the ferromagnetic tip is aligned with the central axis of the coil and balanced within the ambient magnetic environment of the assembly.

5. The profilometer of claim 2 wherein the ferromagnetic tip is nearly touching the coil at its closest position to the coil.

6. The profilometer of claim 2 wherein the ferromagnetic tip enters the center bore of the coil at its closest position to the coil.

7. The profilometer of claim 1 wherein the feedback means comprises, a signal conditioning circuit for selecting and storing first analog signals generated by the stylus displacement measuring means, the analog signals corresponding to vertical positions of the stylus tip to form data points, an analog-to-digital converter for converting the first analog signals to digital signals, a digital signal processor for generating a polynomial curve for data points collected while the stylus tip is not engaged, the curve being adjusted by a steady signal offset to represent the desired force upon the stylus tip while contacting the specimen, the processor providing modulation of the signals for the positions on the specimen to conform to the adjusted curve, a digital-to-analog converter for converting the modulated signals to second analog signals, and a drive circuit for using the second analog signals to modulate the stylus force biasing means for the positions on the specimen.

8. The profilometer of claim 1 further comprising a stylus-stabilizing sensor assembly, the sensor assembly comprising, a movable support body operably connected to the stylus arm, the support body attached to an end piece with a pivot shaft at a first end and a stabilizing arm with a ball at a second end, the ball and two ends of the pivot shaft defining a triangle within which lies a lift point and the mass center of the support body, means for lifting and lowering the support body at the lift point such that the support body rotates on the pivot shaft and also lifts the stylus arm out of contact with the specimen, and a fixed flat pad positioned below the support body for contact with the ball when the support body is lowered.

9. The profilometer of claim 8 wherein the pivot shaft further comprises, a first and a second hardened metal pin mounted in the end piece along a pivot shaft axis, a first and a second annular bearing each having at least one toroidal surface, each annular bearing contacting one of the metal pins along its toroidal surface and supporting one of the metal pins, a fixed end bearing axially locating the first metal pin, and a spring-loaded end bearing applying axial force to the second metal pin.

10. The profilometer of claim 9 further comprising, a spring mounted on the end piece between the metal pins and along the pivot shaft axis, the spring urging the pins into contact with the annular bearings as the support body is lowered.

11. The profilometer of claim 9 wherein the ball, bearings, and flat pad are made of sapphire and the metal pins are made of polished hardened steel alloy.

12. The profilometer of claim 8 wherein the points of the triangle define small contact points which are finely finished surfaces of hard, high modulus materials.

13. The profilometer of claim 9 wherein the pivot shaft axis is positioned at a 20° angle from horizontal and the means for lifting and lowering the support body causes movement of the support body along a slanted arcuate path.

14. The profilometer of claim 1 further comprising a dual-view optical system for viewing of the specimen, the optical system comprising, a first light source incident upon the specimen from directly above the specimen, a second light source incident upon the specimen from a side angle, a top-view collection optical path associated with the first light source, a side-view collection optical path associated with the second light source, a switchable mirror having a first position for selecting the top-view optical path and a second position for selecting the side-view optical path.

15. The profilometer of claim 14 further comprising, means for lifting the stylus arm out of contact with the specimen, the means for lifting the stylus arm operably connected to the switchable mirror such that lifting of the stylus arm selects the first position of the switchable mirror and lowering of the stylus arm selects the second position of the switchable mirror.

16. The profilometer of claim 14 wherein the second light source is incident upon the specimen from an angle of approximately 45°.

17. The profilometer of claim 1 further comprising a temperature drift compensator having, a temperature measurement device for measuring air temperature within the profilometer and producing temperature measurement signals as a function of the air temperature, and a signal processing means storing preprogrammed information regarding temperature impulse response of the profilometer, the signal processing means for (a) receiving the temperature measurement signals from the temperature measurement device, and receiving vertical measurement signals from the stylus displacement measurement means, (b) compensating the vertical measurement signals for vertical offset due to temperature changes, and (c) compensating the vertical measurement signals for vertical gain due to temperature changes.

18. The profilometer of claim 17 wherein the preprogrammed information stored in the signal processing means regarding temperature impulse response has been derived from exposure of the profilometer to a sudden ambient temperature change and a measurement of vertical offset and vertical gain for a given vertical measurement.

19. The profilometer of claim 1, wherein said feedback means includes a device storing a plurality of reference positions of the tip, wherein said feedback means controls the stylus force biasing means in response to the stored reference positions.

20. The profilometer of claim 1, wherein said feedback means comprises a digital circuit.

21. The profilometer of claim 1, wherein said feedback means controls the desired level of force irrespective of any actual force between the stylus tip and the specimen.

22. A profilometer for microstructures comprising, an elongated stylus arm having a stylus mounted thereon for contact with a specimen, the stylus arm associated with a stylus displacement measuring means, a magnetic stylus force biasing means operably connected to the stylus arm for urging the stylus tip into contact with the specimen, feedback means in electrical communication with the stylus displacement measuring means for electrically controlling the magnetic stylus force biasing means to apply a constant desired level of force to the specimen, and a magnetic shield surrounding the stylus force biasing means, the magnetic shield comprising, a primary shield of low hysteresis, high permeability material shaped to closely house the coil, and a secondary shield of low hysteresis, high permeability material shaped to substantially enclose the primary shield, the coil, and a portion of the lever having the ferromagnetic tip.

23. The profilometer of claim 22 wherein the primary shield is a cup composed of a ferrite material.

24. The profilometer of claim 23 wherein the ferrite material is powdered iron.

25. The profilometer of claim 22 wherein the secondary shield is a foil cylinder positioned symmetrically about the primary shield and the coil.

26. The profilometer of claim 25 wherein the foil is a high permeability nickel-iron alloy.

27. The profilometer of claim 22 wherein the primary and secondary shields are spaced apart with nonmagnetic spacers.

28. A constant-force profilometer for microstructures comprising, a stylus arm for step-height measurements of a specimen, said arm being substantially rigid when it is in contact with and moved over the specimen, a displacement transducer rigidly connected to the stylus arm, said transducer having means for providing a signal to indicate a current position of the stylus arm when the stylus arm moves over the specimen, a stylus force biasing means operably connected to the stylus arm for urging the stylus tip into contact with the specimen, and feedback means responsive to the signal from the transducer for controlling the stylus force biasing means to apply a desired level of force to the specimen, said force being a function of the current position of the stylus tip, said feedback means including a digital circuit.

29. The profilometer of claim 28 wherein the feedback means comprises, a signal conditioning circuit for selecting and storing first analog signals generated by the motion transducer, the analog signals corresponding to step-heights, to form data points, an analog-to-digital converter for converting the first analog signals to digital signals, a digital signal processor for generating a polynomial curve for data points collected while the stylus tip is not engaged, the curve being adjusted by a steady signal offset to represent the desired force upon the stylus tip while contacting the specimen, the processor providing modulation of the signals for the positions on the specimen to conform to the adjusted curve, a digital-to-analog converter for converting the modulated signals to second analog signals, and a coil drive circuit for using the second analog signals to modulate current in the coil for the positions on the specimen.

30. The profilometer of claim 28, further comprising a support block having opposed forward and rearward sides and a central region with a pivot therebetween mounted for turning on an axis, the support block supporting the stylus arm on the forward side, said rearward side attached to the transducer, wherein the pivot is a flexural pivot.

31. The profilometer of claim 28 further comprising a magnetic shield of low hysteresis, high permeability material surrounding the coil and the ferromagnetic tip, the magnetic shield axially-aligned with the coil and having a slot for penetration and movement of the lever.

32. The profilometer of claim 31 wherein the magnetic shield comprises, a primary shield of low hysteresis, high permeability material shaped to closely house the coil, and a secondary shield of low hysteresis, high permeability material shaped to substantially enclose the primary shield, the coil, and a portion of the lever having the ferromagnetic tip.

33. The profilometer of claim 32 wherein the primary and secondary shields are spaced apart with nonmagnetic spacers.

34. The profilometer of claim 32 wherein the primary shield is a cup composed of a ferrite material.

35. The profilometer of claim 32 wherein the secondary shield is a foil cylinder composed of a high permeability nickel-iron alloy.

36. The profilometer of claim 32, wherein the secondary shield is positioned symmetrically about the primary shield, the coil, and the portion of the lever having the ferromagnetic tip.

37. The profilometer of claim 28 wherein the ferromagnetic tip is composed of a hard magnetic material.

38. The profilometer of claim 28 wherein the ferromagnetic tip is positioned directly above the pivot member.

39. The profilometer of claim 28 further comprising a stylus-stabilizing sensor assembly, the sensor assembly comprising, a movable support body operably connected to the stylus arm, the support body attached to an end piece with a pivot shaft at a first end and a stabilizing arm with a ball at a second end, the ball and two ends of the pivot shaft defining a triangle within which lies a lift point and the mass center of the support body, a spring mounted on the end piece along a pivot shaft axis, the spring urging the support body downward, means for lifting and lowering the support body at the lift point such that the support body rotates on the pivot shaft and also lifts the support block, and a fixed flat pad positioned below the stabilizing arm for contact with the ball when the support body is lowered.

40. The profilometer of claim 39 wherein the pivot shaft further comprises, a first and a second hardened metal pin mounted in the end piece along the pivot shaft axis, a first and a second annular bearing each having at least one toroidal surface, each annular bearing contacting one of the metal pins along its toroidal surface and supporting one of the metal pins, a fixed end bearing axially locating the first metal pin, and a spring-loaded end bearing applying axial force to the second metal pin.

41. The profilometer of claim 28 further comprising a dual view optical system for viewing of the specimen, the optical system comprising, a first light source incident upon the specimen from directly above the specimen, a second light source incident upon the specimen from a side angle, a top-view collection optical path associated with the first light source, a side-view collection optical path associated with the second light source, a switchable mirror having a first position for selecting the top-view optical path and a second position for selecting the side-view optical path.

42. The profilometer of claim 41 further comprising, means for lifting the stylus arm out of contact with the specimen, the means for lifting the stylus arm operably connected to the switchable mirror such that lifting of the stylus arm selects the first position of the switchable mirror and lowering of the stylus arm selects the second position of the switchable mirror.

43. The profilometer of claim 28 further comprising a temperature drift compensator having:

a temperature measurement device for measuring air temperature within the profilometer and producing temperature measurement signals as a function of the air temperature, and a signal processing means storing preprogrammed information regarding temperature impulse response of the profilometer, the signal processing means for (a) receiving the temperature measurement signals from the temperature measurement device, and receiving vertical measurement signals from the motion transducer, (b) compensating the vertical measurement signals for vertical offset due to temperature changes, and (c) compensating the vertical measurement signals for vertical gain due to temperature changes.

44. The profilometer of claim 43 wherein the preprogrammed information stored in the signal processing means regarding temperature impulse response has been derived from exposure of the profilometer to a sudden ambient temperature change and a measurement of vertical offset and vertical gain for a given vertical measurement.

45. A constant-force profilometer comprising, an elongated stylus arm having a stylus tip mounted for contact with a specimen in accord with desired force signals, a magnetic stylus force biasing means having a current-carrying solenoidal coil, the stylus force biasing means operably connected to the stylus arm for urging the stylus tip into contact with the specimen, a stylus displacement measuring means associated with the stylus arm, the displacement measuring means producing a displacement analog signal, a signal conditioning circuit for selecting and storing first analog signals corresponding to vertical positions to form data points, an analog-to-digital converter for converting the first analog signals to digital signals, a digital signal processor means for converting displacement signals to force signals and comparing with desired force signals and for generating a polynomial curve for data points collected while the stylus tip is not engaged, the curve being adjusted by a steady signal offset to establish the desired force signals, the processor providing modulation of the force signals for the positions on the specimen to conform to the adjusted curve, a digital-to-analog converter for converting the modulated signals to second analog signals, and a coil drive circuit for using the second analog signals to modulate current in the solenoidal coil for the positions on the specimen.

46. The constant-force profilometer of claim 45 further comprising, a magnetic shield surrounding the stylus force biasing means.

47. A method for controlling the stylus force in a profilometer having a magnetic stylus force biasing mechanism with a current-carrying force coil, the method comprising, moving a nonengaged stylus to a plurality of specified vertical positions, the stylus generating an electrical signal corresponding to step heights, reading and storing a first electrical signal corresponding to each position to form a first set of data points, generating a polynomial curve for the first set of data points, adjusting the polynomial curve by steady signal offsets to form a second set of data points comprising a second electrical signal for each position, engaging the stylus with a specimen to be profiled at a desired force level, profiling the specimen while modulating the force coil current so that the force coil current conforms to the adjusted polynomial curve for achieving the desired force levels.

48. The method of claim 47 further comprising, magnetically shielding the stylus force biasing means prior to moving the nonengaged stylus.

49. A method for controlling the stylus force in a profilometer, the method comprising the steps of:

moving a nonengaged stylus to a plurality of specified vertical positions, the stylus generating an electrical signal corresponding to step heights;

providing an electrical signal corresponding to each of said vertical positions to form a first set of data points;

generating from said first set of data points a second set of data points;

engaging the stylus with a specimen to be profiled at a desired force level, profiling the specimen while modulating a biasing force by the stylus on the specimen as a function of the second set of data points for achieving the desired force levels.

50. The method of claim 49, further comprising:

generating a polynomial curve for the second set of data points, said profiling step modulating the biasing force according to the polynomial curve.

51. The method of claim 43, further comprising:

generating a polynomial curve for the first set of data points; and adjusting the polynomial curve by steady signal offsets to form an adjusted polynomial curve encompassing the second set of data points, said profiling step modulating the biasing force according to the adjusted polynomial curve.

52. The method of claim 43, said profilometer having a magnetic stylus force biasing mechanism with a current-carrying force coil, said profiling step modulating a current in the coil in order to modulate the biasing force.

53. The method of claim 52, further comprising:

magnetically shielding the magnetic stylus force biasing mechanism prior to moving the nonengaged stylus.

54. A method for controlling stylus force in a profilometer, the method comprising the steps of:

providing an elongated stylus arm having a stylus tip mounted thereon for contact with a specimen and moving the tip over the specimen, said arm being substantially rigid when the tip is in contact with the specimen, providing a current position signal to indicate current position information of the stylus tip when the tip moves over the specimen by means of stylus displacement measuring means rigidly connected to said arm, and modulating a force applied by the tip to the specimen as a function of the current position information in order to apply a desired level of force to the specimen.

55. The method of claim 54, further comprising storing a plurality of reference positions of the tip, wherein said modulating step includes modulating the force as a function of the stored reference positions.

56. The method of claim 54, said modulating step including digital signal processing.

57. The method of claim 55, further comprising:

moving a nonengaged stylus to a plurality of specified vertical positions, and generating an electrical signal corresponding to each of said vertical positions; wherein said storing step stores said electrical signals or signals derived therefrom.

58. The profilometer of claim 54, wherein said modulating step modulates the desired level of force irrespective of any actual force between the stylus tip and the specimen.

* * * * *